United States Patent
Baruch et al.

(10) Patent No.: US 11,481,129 B2
(45) Date of Patent: Oct. 25, 2022

(54) SYSTEM AND METHOD FOR IMPORTING AND EXPORTING DATA BETWEEN TAPES TO CLOUD STORAGE

(71) Applicant: MODEL9 SOFTWARE LTD., Kiryat Ono (IL)

(72) Inventors: Offer Baruch, Ganei Tikva (IL); Dori Polotsky, Ramat Gan (IL); Tomer Zelberzvig, Rehovot (IL); Adi Shtatfeld, Kiryat Ono (IL); Roded Bahat, Tel Aviv-Jaffa (IL); Shy Ifrah, Ashdod (IL); Gil Peleg, Kiryat Ono (IL)

(73) Assignee: MODEL9 SOFTWARE LTD, Kiryat Ono (IL)

( * ) Notice: Subject to any disclaimer, the term of this patent is extended or adjusted under 35 U.S.C. 154(b) by 205 days.

(21) Appl. No.: 17/019,300

(22) Filed: Sep. 13, 2020

(65) Prior Publication Data

US 2022/0083220 A1 Mar. 17, 2022

(51) Int. Cl.
*G06F 3/00* (2006.01)
*G06F 3/06* (2006.01)
*G06F 9/30* (2018.01)
*G11B 5/55* (2006.01)

(52) U.S. Cl.
CPC ............. *G06F 3/064* (2013.01); *G06F 3/067* (2013.01); *G06F 3/0682* (2013.01); *G06F 9/30174* (2013.01); *G11B 5/5508* (2013.01); *G06F 3/0607* (2013.01)

(58) Field of Classification Search
CPC ...... G06F 3/064; G06F 3/0607; G06F 3/0646; G06F 3/0647; G06F 3/065; G06F 3/0661; G06F 3/067; G06F 3/0682; G06F 9/3017; G06F 9/30174; G06F 9/46; G11B 5/00813
USPC ....... 707/635, 640, 661, 674, 755, 756, 809, 707/E17.055, 955, 963; 711/154, 161, 711/162, 4; 714/5.1, 6.1
See application file for complete search history.

(56) References Cited

U.S. PATENT DOCUMENTS

| | | | |
|---|---|---|---|
| 9,799,371 B1* | 10/2017 | Hirashima | G11B 20/1886 |
| 2017/0300240 A1* | 10/2017 | Gorlinsky | G06F 3/0661 |
| 2018/0232147 A1* | 8/2018 | Dischinger | G06F 3/0682 |
| 2020/0034064 A1* | 1/2020 | LeCrone | G06F 3/0685 |
| 2020/0089548 A1* | 3/2020 | Kawahito | G06F 8/315 |
| 2021/0232458 A1* | 7/2021 | LeCrone | G11B 5/00813 |

* cited by examiner

*Primary Examiner* — Ilwoo Park

(57) ABSTRACT

Methods, system and computer program product, the method comprising: from high level language code (HLLC), receiving a request for reading a data set from a tape onto an object storage connected over TCP/IP to a mainframe; from the HLLC, allocating a data set on a tape comprising information to be imported, the allocation being in a format of the stored data set record and associated with a JFCB, the tape is mounted in SL mode; updating the JFCB to BLP mode; reading from the tape VOL1 data, and for each stored file initiating by the HLLC: reading HDR1/2, content block-by-block; EOF1/2 of the file; organizing the VOL1, HDR1, HDR2, content, EOF1 and EOF2 in the object storage; and closing the tape, wherein said reading is performed without setting a JES of the mainframe to BLP mode, and said reading is performed without unmounting the tape after each file.

8 Claims, 4 Drawing Sheets

Figure 1:
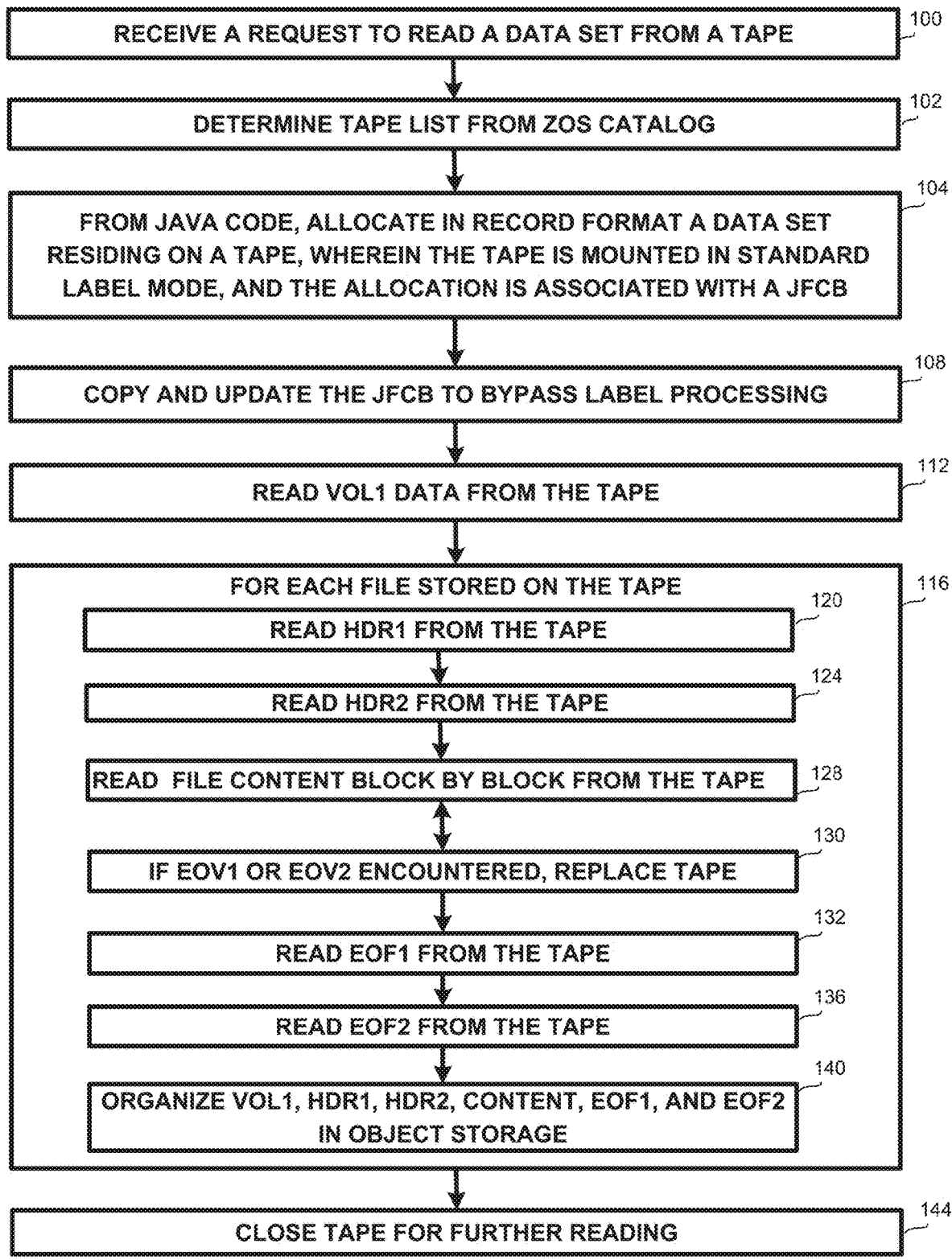

SYSTEM AND METHOD FOR IMPORTING AND EXPORTING DATA BETWEEN TAPES TO CLOUD STORAGE

TECHNICAL FIELD

The present disclosure relates to mainframe computers in general, and to a system and method for importing data from tape storage to cloud storage and exporting back to tape storage, in particular.

BACKGROUND

Backing up computers is an important task in the everyday operation of computer systems. Backup may be required for retrieval of information in cases of human errors, technical failures, upgrades, or the like, as well as for legal or operational reasons.

Traditionally, tapes were used for storing large amounts of computer data. Tapes are reliable and are considered environmentally friendly, i.e., do not waste energy, unlike disks that spin constantly and consume energy. However, tapes have some significant drawbacks. For example, they take up a lot of physical space, and retrieving data from tapes may take a long time, for example in the order of magnitude of minutes, as compared to milliseconds in disks.

In addition, handling tapes necessitates manual labor. For example, operations such as making copies of tapes have to be done manually, creating backups at off-site locations cannot be performed without physically transporting them, or the like. Tapes also need to be manually mounted and unmounted to and from the drive.

Further, when keeping data on tapes for long periods of time, such as years or decades, supporting tape drives have to be maintained in order to retrieve data from the tape when required. This drawback also implies that upgrading the currently used tape drive technology may be a complex operation.

Thus, it may be required to read data backed up on tapes, and store it in more up-to-date storage means, and in particular cloud storage.

However, in order to read data from backup, the stored data needs to be accessible to the relevant program executed by the mainframe.

BRIEF SUMMARY

One exemplary embodiment of the disclosed subject matter is a computer-implemented method comprising: from high level language code, receiving a request for reading a data set from a tape mounted on a MAINFRAME computer tape drive or virtual tape drive, wherein the request for reading the data set is a request to copy the data set onto an object storage connected over TCP/IP; from the high level language code running on the Mainframe operating system, allocating a data set on a tape comprising information to be imported, the allocation being in a format of the data set record as stored on the tape, and the allocation being associated with a Job File Control Block (JFCB), wherein the tape is mounted in Standard Label (SL) mode; updating the JFCB in the data structure to Bypass Label Processing (BLP) mode instead of the SL mode; reading VOL1 data from the tape; for each file of a plurality of files stored on the tape initiating by the high level language code: reading HDR1 of the file from the tape; reading HDR2 of the file from the tape; reading content of the file block-by-block; reading EOF1 of the file from the tape; and reading EOF2 of the file from the tape; and organizing the VOL1, HDR1, HDR2, content, EOF1 and EOF2 in the object storage; and closing the tape for further reading, wherein said reading is performed without setting a job class environment of the mainframe Job Entry Subsystem to BLP mode, and wherein said reading is performed without unmounting the tape after reading each file of the plurality of files. Within the method, said allocating is optionally in share disposition mode. Within the method, the high level language code is optionally Java code. Within the method, said organizing optionally comprises storing the HDR1, HDR2, content, EOF1 and EOF2 in a plurality of chunk objects, wherein a mapping object maps the chunks and a link object points at the mapping object. Within the method, the VOL1, the HDR1 and HDR2 are optionally stored in a header file comprised of a single first chunk, the EOF1 and EOF2 are optionally stored in a trailer file comprised of a single second chunk, and the content is optionally stored in an unnamed file comprised of one or more chunks, and wherein the mapping object points at the header file, at the unnamed file and the trailer file chunks. Within the method, reading the content of the file into the data set allocated in record format is optionally performed block by block regardless of records. Within the method, the object storage is optionally a cloud storage.

Another exemplary embodiment of the disclosed subject matter is a computer-implemented method comprising: from high level language code, receiving a request for writing a data set representing a file to a tape or virtual tape or disk mounted on a mainframe computer tape drive or virtual tape drive or disk drive, respectively, wherein the request for writing the data set is a request to copy the data set from an object storage connected over TCP/IP, the object storage comprising contents of the file to be exported; from the high level language code, locating a mapping object; reading VOL1 pointed at by the mapping object from the object storage; from the high level language code running on the Mainframe operating system, allocating a tape or virtual tape or disk data set, respectively, based on the VOL1, the allocation being in a format of the disk data set; from the high level language code retrieving data chunks from the object storage into the data set; from the high level language code providing block by block the file contents from the data set to an assembly program to be written to the tape or virtual tape or disk, respectively; and closing the data set. Within the method the object storage is optionally a cloud storage. Within the method, the high level language code is optionally Java code. Within the method, the object storage optionally stores the HDR1, HDR2, content, EOF1 and EOF2 in a plurality of chunk objects, wherein a mapping object optionally maps the chunks and a link object points at the mapping object. Within the method, the object storage optionally stores the VOL1, the HDR1 and HDR2 in a header file comprised of a single first chunk, the EOF1 and EOF2 are stored in a trailer file comprised of a single second chunk, and the content is optionally stored in an unnamed file comprised of one or more chunks, and wherein the mapping object optionally points at the header file, at the unnamed file and the trailer file chunks.

Yet another exemplary embodiment of the disclosed subject matter is a computer program product comprising a computer readable storage medium retaining program instructions, which program instructions when read by a processor, cause the processor to perform a method comprising: from the high level language code, receiving a request for writing a data set to a disk in AWSTAPE format, the disk mounted on a mainframe computer, wherein the request for writing the data set is a request to copy the data set from an object storage connected over TCP/IP, the object storage comprising information to be exported; from the high level language code, locating a mapping object and retrieving data chunks into the data set; from the high level language code running on the Mainframe operating system, allocating a disk data set in AWSTAPE format; from the high level language code, retrieving data chunks from the object storage into the data set; by the high level language code, providing block by block VOL1, HDR1, HDR2, file content, EOF1 and EOF2 from Java to an assembly program to be written to the data set on the disk; and closing the data set. Within the method, the object storage is optionally a cloud storage. Within the method, the object storage optionally stores the VOL1, HDR1, HDR2, content, EOF1 and EOF2 in a plurality of chunk objects, wherein a mapping object maps the chunks and a link object points at the mapping object. Within the method, the object storage optionally stores the VOL1, the HDR1 and HDR2 in a header file comprised of a single first chunk, the EOF1 and EOF2 are optionally stored in a trailer file comprised of a single second chunk, and the content is optionally stored in an unnamed file comprised of one or more chunks, and wherein the mapping object points at the header file, at the unnamed file and the trailer file chunks. Within the method, the object storage is optionally a cloud storage. Within the method, the high level language code is Java code.

Yet another exemplary embodiment of the disclosed subject matter is a computer program product comprising a computer readable storage medium retaining program instructions, which program instructions when read by a processor, cause the processor to perform a method comprising: from high level language code, receiving a request for reading a data set from a tape mounted on a MAINFRAME computer tape drive or virtual tape drive, wherein the request for reading the data set is a request to copy the data set onto an object storage connected over TCP/IP; from the high level language code running on the Mainframe operating system, allocating a data set on a tape comprising information to be imported, the allocation being in a format of the data set record as stored on the tape, and the allocation being associated with a Job File Control Block (JFCB), wherein the tape is mounted in Standard Label (SL) mode; updating the JFCB in the data structure to Bypass Label Processing (BLP) mode instead of the SL mode; reading VOL1 data from the tape; for each file of a plurality of files stored on the tape initiating by the high level language code: reading HDR1 of the file from the tape; reading HDR2 of the file from the tape; reading content of the file block-by-block; reading EOF1 of the file from the tape; and reading EOF2 of the file from the tape; and organizing the VOL1, HDR1, HDR2, content, EOF1 and EOF2 in the object storage; and closing the tape for further reading, wherein said reading is performed without setting a job class environment of the mainframe Job Entry Subsystem (JES) to BLP mode, and wherein said reading is performed without unmounting the tape after reading each file of the plurality of files.

THE BRIEF DESCRIPTION OF THE SEVERAL VIEWS OF THE DRAWINGS

Figure 2:
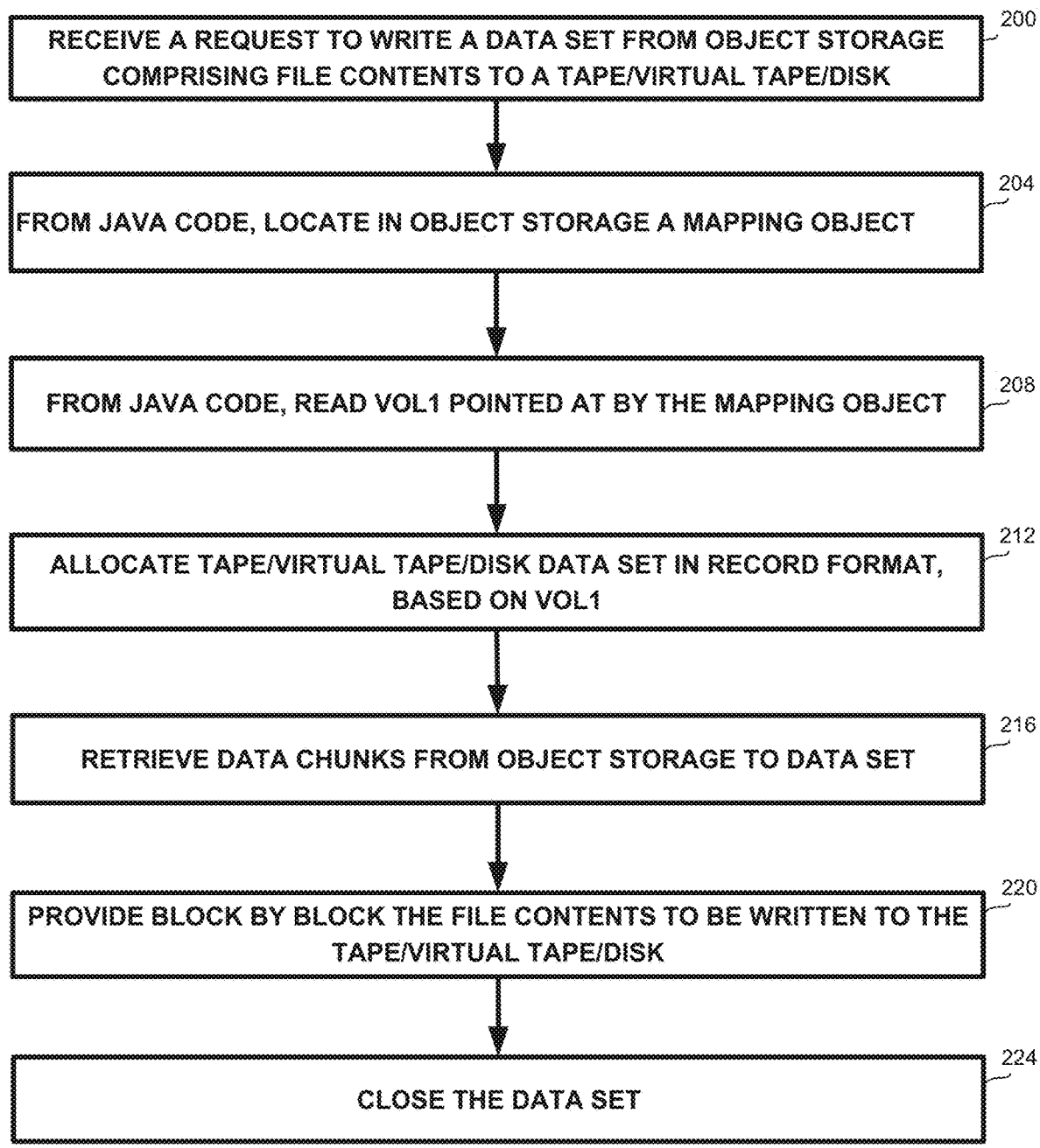
Figure 3:
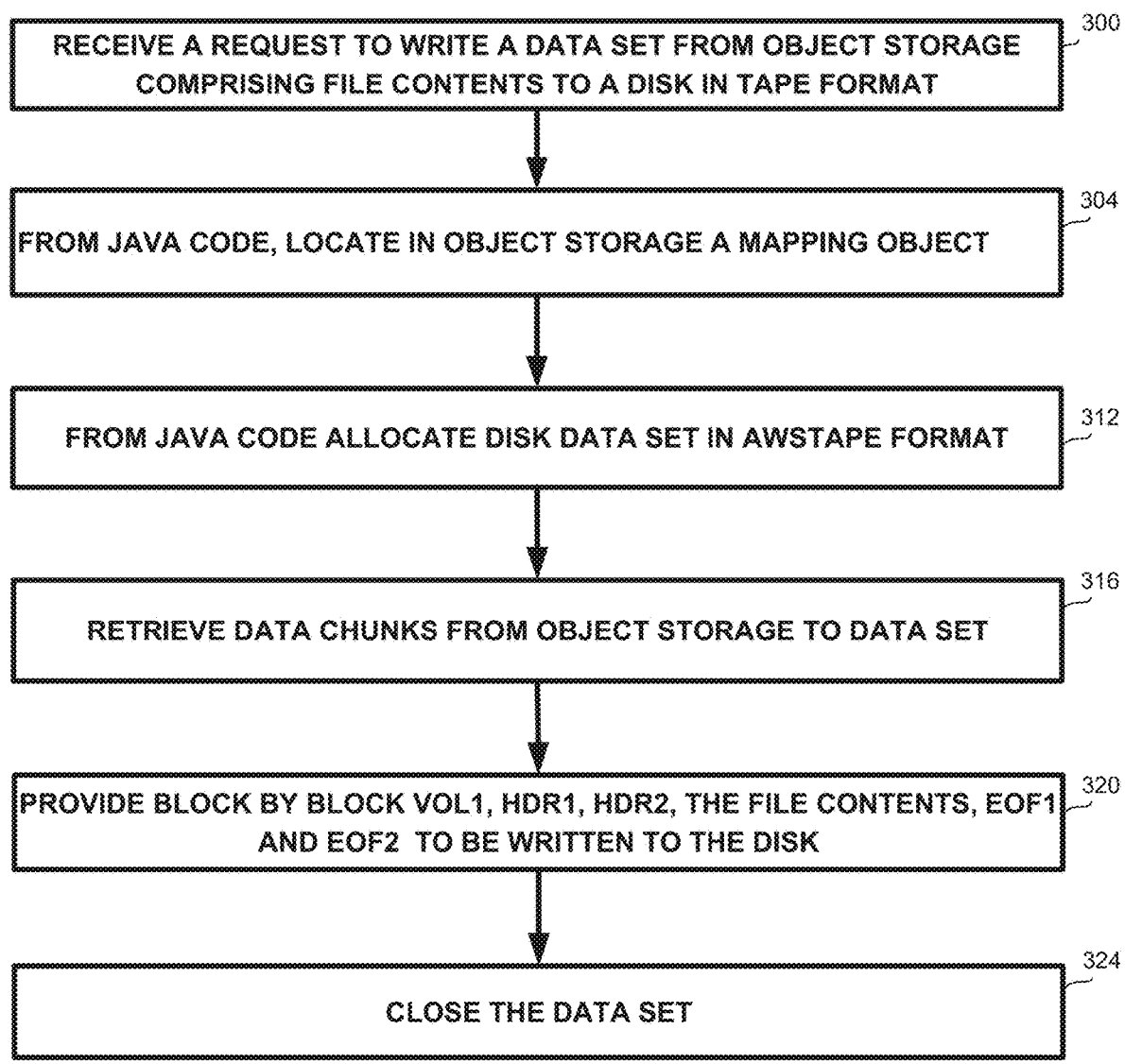
Figure 4:
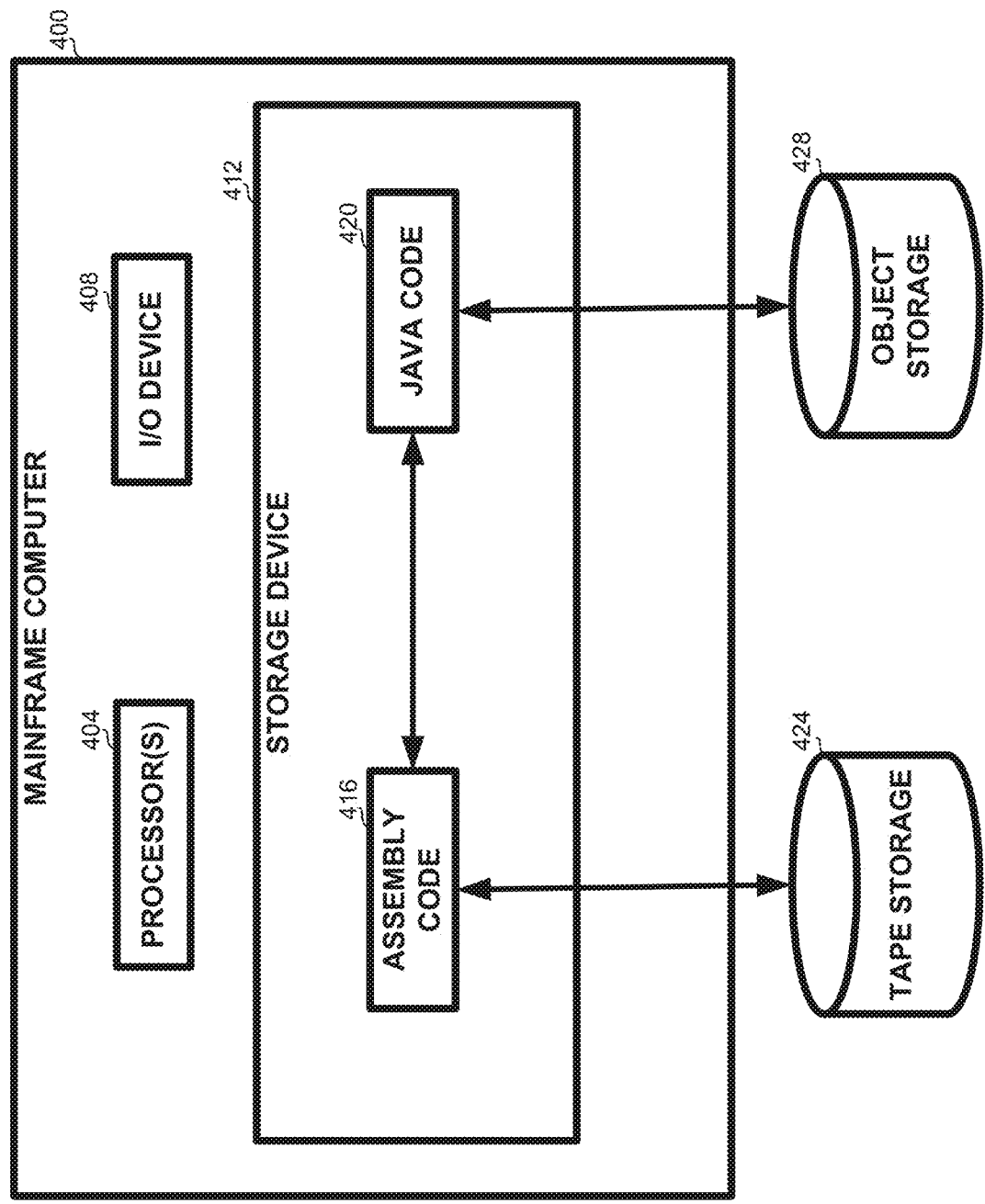

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 is a flowchart of steps in a method for importing data from a tape to object storage, in accordance with some embodiments of the disclosure; and FIG. 2 is a flowchart of steps in a method for exporting data form object storage to a tape, a virtual tape, or a disk, in accordance with some embodiments of the disclosure;

FIG. 3 is a flowchart of steps in a method for exporting data form object storage to a disk in tape format, in accordance with some embodiments of the disclosure; and FIG. 4 is a block diagram of components in a mainframe computer in which data is imported and exported between tale drives and open storage to and from object storage, in accordance with some exemplary embodiments of the subject matter.

DETAILED DESCRIPTION

The disclosure relates to a growing need to import data from a mainframe (MF) tape to object storage, and in particular to cloud storage. However, the disclosure is not limited to cloud storage, and is equally applicable to storing the data on other storage media, such as on-premises, hybrid storage, or the like.

In the disclosure below, the term "file" refers to a sequence of binary values in the context of object storage, while the term "data set" relates to a sequence of binary values in the context of a tape. However, the terms may be used interchangeably.

In particular, it is required to read data stored on mainframes tapes from high level languages, such as Java®. This enables connectivity to various modern applications, which may in turn enable the applications to operate on large amounts of data collected over the years, and also provides financial benefits, as mainframe manufacturers promote innovation and encourage their users to program in high level language.

However, using current technologies. Java programs executed by a mainframe can only access data on a tape record-by record, using for example IBM JZOS ZFile or RecordReader classes. This disables access to important information related to the blocks and to the metadata of the information stored on the tape.

Although accessing the tape with unknown record format (RECFM=U) enables the reading of blocks, and JZOS also supports the large block interface, this still provides limited information about the data set such as LRECL and RECFM.

Thus, the existing java interface, as provided by JZOS, is insufficient for a number of reasons:

JZOS allows the reading of the tape header VOL1, the data set headers HDR1 and HDR2, and the data set trailers EOF1 and EOF2, or the information contained within the data set, but allows reading either the content or the accompanying data, but not both. Thus, when reading the data sets, the accompanying information which may be significant, is inaccessible.

Another drawback is that the volume cannot be scanned, so it is impossible to access a file without explicit knowledge that the data set is stored on the tape, unless the tape is allocated in BLP format which requires special permission, and also requires multiple mounts with JZOS. This drawback also disables the reading of a mass of data.

Yet another drawback is that in order to read a plurality of data sets from the same volume, the volume needs to be unmounted and re-mounted between two consecutive readings. The same drawbacks may also be applicable to high level programming languages other than Java.

Reading blocks rather than records, which may avoid some of the mentioned drawbacks, requires the allocation of a data set with undefined record format (RECFM=U), which would override the real record format (RECFM) of the data set, which then cannot be fetched without allocating the data set again.

The accompanying information on the tape may be accessed by mounting the tape in bypass label processing format (BLP) rather than Standard Label format (SL). However, allocating a data set with BLP (LABEL=BLP) requires to set the BLP parameter in the JOBCLASS to YES, which may have undesired effects on other aspects of the system.

Thus, one technical problem addressed by the disclosure is the need to retrieve data stored on mainframe tapes from high level language code.

Another technical problem addressed by the disclosure is the need to access all the information on the tape on a block by block level, including information of which data sets are stored, accessing a specific data set, and reading the volume and data set headers and trailers.

Yet another technical problem addressed by the disclosure is the need to read multiple data blocks without having to unmount and re-mount the tape after reading each data set.

Yet another technical problem addressed by the disclosure is the need to write the information as retrieved from a tape back to a tape, a virtual tape, a disk, or a disk in tape format, with all accompanying data.

One technical solution of the disclosure is a method for accessing a tape from a high level programming language, comprising allocating a data set as standard label (LABEL=SL), thereby avoiding setting the JOBCLASS parameter to YES, as the data set is not allocated with BLP. Then, when it is required to open the tape, the label in the Job File Control Block (JFCB) is overridden to BLP instead of SL. The data set may be opened with TYPE=J which specifies that a JFCB is provided.

Usually, the data set sequence is specified during allocation. Since it is required to read multiple data sets in the same allocation, the sequence in the JFCB may be overridden before each open command.

In some embodiments, in order to support Large Block Interface (LBI), the block size in the Data Control Block Extension (DCBE) may be set.

The data can then be read block by block from the tape, and stored in an object storage, whether locally, or remote, for example on a remote storage device, on cloud storage, or the like.

The CLOSE macro may then be called with the LEAVE option, such that it is unnecessary to unmount the tape.

Another technical solution relates to exporting data from the object storage to a tape, a virtual tape, or a disk, by high-level language, such as Java code.

The solution comprises locating in the object storage a mapping object corresponding to the data set to be written may be located within the object storage, reading the HDR1 pointed at by the mapping object, allocating a data set in its original record format on the tape or virtual tape or disk data set, based on the parameters read from the HDR1, retrieving the data set contents block by block, providing the contents to the tape, virtual tape, or disk, and closing the data set.

Yet another technical solution relates to exporting data from the object storage to a disk in tape format. The solution comprises locating within the object storage a mapping object corresponding to the file to be written, allocating a disk data set in AWSTAPE, retrieving block by block the file contents from the object storage, as well as the VOL1, HDR1, HDR2. EOF1 and EOF2 and providing the blocks to the disk, and closing the data set.

One technical effect of the disclosure is the provisioning of a method for accessing on block level, from a high-level programming language such as Java®, any data set stored on a tape of a mainframe. Such access enables reading all the information from the tape, including meta data such as the volume and data sets' headers and trailers. The solution enables scanning the tape without pre-acquired information of its content, and the full information may be read without having to unmount and remount the tape between accesses to any two data sets. The solution also enables the reading of tapes with data sets with large block sizes, e.g., block size exceeding 64K.

Another technical effect of the disclosure is that the method does not require setting the BLP parameter in the JOBCLASS to YES, thus avoiding undesired system-wide effects and installation overhead.

Yet another technical effect of the disclosure is the provisioning of a method for exporting information retrieved from a tape, back to a tape, virtual tape, disk or disk in tape format, without losing any of the tape information, the data sets' contents, headers or trailers.

Referring now to FIG. 1, showing a flowchart of steps in a method for importing data from a tape mounted on a mainframe computer using a high level programming language.

On step 100, a request to read a data set from a tape may be received from a user via a user interface, from an automated system, from another computer program, or the like. The command may be received by a high level language program, or a corresponding a high level language program may be started in response to such request.

In some situations, the data set may be stored on multiple tapes. Thus, on step 102, the tape list on which the data set is stored may be obtained from a catalog maintained on the ZOS.

On step 104, a data set residing on the tape may be allocated in record format. The tape may be mounted in Standard Label (SL) to avoid changing the JES2 jobclass to BLP setting, and the allocation may be associated with a JFCB. The data set may be allocated in share (SHR) mode, since it is a reading action and thus need not be exclusive. The allocation may not require a data set name.

On step 108, the JFCB, being the control block that enables to change definitions, may be copied and updated to BLP, by setting the bit that opens in BLP.

Listing 1 below shows exemplary code for updating the JFCB:

Listing 1

```
*---------------------------------------------------------------------
* Edit JFCB: set the file sequence number
*---------------------------------------------------------------------
 EDIT_JFCB DS 0H
 _JFCB USING ZM9JFCB,_W24.W24_JFCB
   L    R1,_COMM.SEQR_SEQ_NUM_FL4
   STH  R1,_JFCB.JFCBFLSQ
* start and set the JFCB label indicator type to BLP
   OI   _JFCB.JFCBLTYP,JFCBLP
   DROP _JFCB
```

On step 112 the data set may be opened, and the volume header VOL1 may be read from the tape, for example by Basic Sequential Access Method (BSAM). The data set may be opened in supervisor state, as further detailed in U.S. Pat.

No. 9,740,461 titled "System and Method for Executing User Channel Programs on Mainframe Computers", incorporated herein by reference in its entirety for any purpose. Using the TYPE=J instructs the usage of a user provided JFCB, which enables to open the data set in BLP, although the original data set was not opened with BLP.

Listing 2 below shows exemplary code for opening the data set:

---
Listing 2
---

```
*--------------------------------------------------
* Open input DD
*--------------------------------------------------
IN_OPEN DS 0H
    MVC _W24.W24_OPEN_ LF,MOPENJ
* supervisor mode required to open a BLP label indicator type when BLP was
* not specified in the ALLOC.
    MODESET MODE=SUP
    OPEN (_W24.W24_DCB,INPUT), TYPE = J, +
      MF=(E,_W24.W24_OPEN_LF)
    LR R5,R15
* Set to problem state, unlike supervisor
    MODESET MODE=PROB
```

The content stored on the tape may then be analyzed, and for each data set stored in the tape the following steps 116 may be repeated. The steps may be initiated by the high level programming code, for example Java code, which may activate assembly code.

On step 120, the first header of the data set, HDR1, may be read by BASM.

On step 124, the second header of the file data set, HDR2, may be read by BASM.

On step 128, the contents of the data set may be read by BASM, using multiple accesses to the tape.

If the data set is dispersed between two or more tapes, then on step 130 End of Volume (EOV)1 and EOV2 may be encountered between two blocks. In such case, the tapes may be replaced and reading may continue from the next tape. However, the EOV1 and EVO2 are not stored on the object storage.

On step 132, the first trailer of the data set, EOF1, may be read by BASM.

On step 136, the second trailer of the data set, EOF2, may be read by BASM.

If it is known that the data set is dispersed over multiple tapes, and an incorrect number (smaller or larger) of EOV1 and EOV2 have been encountered before the EOF1 and EOF2 are encountered, an error is detected and an exception may be thrown.

On reading steps 112, 120, 124, 128, 132 and 136, the BSAM reader may read one block as a time, and may notify the calling high level language code that the block is ready. It then waits for the high level language code to notify back that it is done with the block. The program keeps looping until the all required parts are fully read.

Listing 3 below shows exemplary Java code for reading and storing the data, wherein the handleReceivedBlock-ByteBuffer method is called to store the data in the object storage.

---
Listing 3
---

```
try (TapeDataSetBlockReader tapeDataSetBlockReader =
tapeDataSetBlockReaderFactory
    .create(utilityRun; tapeDataSet)) {
  tapeDataSetBlockReader.open( );
  TapeDataSetDescriptor tapeDataSetDescriptor =
tapeDataSetBlockReadendescribe( );
    logger.fine(( ) -> "execute( ) - Reader opened, about to backup: " +
tapeDataSetDescriptor);
    extractDetails.setRecfm(tapeDataSetDescriptor.getRecfm( ));
    extractDetails.setLrecl(tapeDataSetDescriptor.getLrecl( ));
    extractDetails.setBlksize(tapeDataSetDescriptor.getBlksize( ));
        extractDetails.setDsorgRepresentation(tapeDataSet
              Descriptor.getDsorgRepresentation( ));
  final ByteBuffer dataChunkBuffer =
        ByteBuffer.allocate(chunkMaxBufferSize);
  AtomicInteger totalBytesRead = new AtomicInteger(0);
  AtomicInteger totalBytesWritten = new AtomicInteger(0);
  tapeDataSetBlockReader.read(byteBuffer, ->
      handleReceivedBlockByteBuffer(
            byteBuffer,
            dataChunkBuffer,
            chunkThresholdSize,
            totalBytesRead,
            totalBytesWritten
  ));
  int lastChunkSize = dataChunkBuffer.position( );
  if (lastChunkSize > 0) {
      logger.fine(( ) -> "execute( ) - Final data chunk size: " +
lastChunkSize);
        ongoingMultichunkTransfer.storeBufferAsDataChunk(
            Arrays.copyOfRange(dataChunkBuffer.array( ), 0, lastChunkSize),
            totalBytesWritten.get( ));
      totalBytesWritten.addAndGet(lastChunkSize);
  }
logger.fine(( ) -> "Import data ended. Total bytes read: "
    + totalBytesRead
    + "; total bytes written: "
+ totalBytesWritten);
```

Listing 4 below shows exemplary assembly code for reading a next block and communicating with Java code. It is noted that in order to call the ASM programs, JNI is used which may call a special invocation module written in 64 bit.

---
Listing 4
---

```
*--------------------------------------------------------------------
* Reading next block
*--------------------------------------------------------------------
READ_NEXT_BLK DS 0H
    ZM9CWTO LEVEL=DIAG1,'ZM9T000D READING NEXT BLOCK'
    MVC _W24.W24_DECB,MREAD
    LAY R5,_W31.W31_BLK_XL256K
    READ W24.W24_DECB,                        +
      SF,                                     +
      _W24.W24_DCB,                           +
      (R5),                                   +
      'S',                                    +
```

Listing 4

```
    MF=E
  CHECK _W24.W24_DECB
  ZM9CWTO LEVEL=DIAG1,'ZM9T000D DONE READING BLOCK'
_DECB USING DECB,_W24.W24_DECB
  L R1,_DECB.DECIOBPT
  AHI R1,-(IOBSTDRD-IOB)
  DROP _DECB
_IOB USING IO,R1
  MVC _COMM.SEQR_BLK_BUFF_LEN_FL4,_IOB.IOBLENRD
  DROP _IOB
  ZM9CWTO LEVEL=DIAG1,'ZMT000D MAKING COMM-AREA STATE TO
READY'
  ST R5,_COMM.SEQR_BLK_BUFF_AL4
  MVI _COMM.SEQR_STATE_FLAG_XL1,#SEQR_STATE_READY_BUF
  ZM9CWTO LEVEL=DIAG1,'ZM9T000D POSTING JECBPTR'
  L R5,_COMM.SEQR_JECBPTR_AL4
* Call Java, block is ready
  POST (R5)
  ZM9CWTO LEVEL=DIAG1,'ZM9T000D WAITING ON EECBPTR'
  L R5,_COMM.SEQR_EECBPTR_AL4
* Waiting for Java to call the assembly back and indicate that block handling is done
  WAIT ECB=(R5)
  XC 0(4,R5),0(R5)
* Check abort signal, loop as long as not aborted
  ASM_IF (CLI _COMM.SEQR_ABORT_SIGNAL_XL1,EQ,  *
    #SEQR_ABORT_SIGNAL_Y) THEN
  ZM9CWTO LEVEL=DEBUG,'ZM9T000D ABORT SIGNAL RECEIVED'
  J FINAL_POST
  ASM_ELSE,
  J READ_NEXT_BLK
  ASM_ENDIF ,
```

The BSAM reader may be called without having to unmount and remount the tape between consecutive calls, thus eliminating an important disadvantage of current technologies and saving significant time and human labor.

In some embodiments, a LINK macro or an ATTACH macro may be used to call the BSAM reader. The ATTCH macro may be preferable, since it wraps the assembly code and may provide protection of the high level language code from exceptions or abnormal termination (ABEND) of the BASM reader, such as x13, x14 or the like. The macro may also ensure that the Recovery Termination Manager (RTM) closes the data set, such that the high level language data structure can be released. The ATTACH macro may be called with the SZERO parameter being set to NO in order to avoid memory leaks.

On step 140, the read data may be organized in an object storage. The data may be organized in an object structure comprising three object types:

The first object type is a link, which only contains metadata and points to a so mapping object. The link allows for searching or listing of objects by a mainframe resource name, similar to a database index. The link object may also include some technical metadata about the mainframe resource, such as DSORG, RECFM, block size, or the like.

The second object type is a Mapping Object, such as a json object, describing the physical properties and structure of all chunk objects related to a single backup of a single data set. The Mapping Object points at multiple files, for example three files: an unnamed file containing the actual data, a header file containing the VOL1, HDR1 and HDR2 information, and a trailer file containing the EOF1 and EOF2 information. The files may be useful during exporting the content with the original data to a tape.

The third object type is the chunk object, being a blob of binary data, containing the blocks (or tracks if the backup is from a disk) of a mainframe resource. The binary data being divided into a plurality chunks is a direct and desired result of the block-by-block reading, which enables access to the low level data, independently of the applicative information embedded within the data set. Thus, a single mainframe resource backup can be comprised of multiple chunks. The chunks may or may not be compressed. The plurality of chunks may provide for parallel reading and writing from and to object storage.

It will be appreciated that the same object structure may be used for different purposes, such as: archiving wherein the data is moved from the disk to an object storage; backup wherein the data is copied from the disk to an object storage; imports wherein a copy of the data is copied from the tape to object storage; and archiving a tape data set wherein the data is moved from tape to object storage.

For example, a directory structure for links may look as follows:

model9-bucket/model9/group-SYSPLEX/archives/
model9-bucket/model9/group-SYSPLEX/backups/
model9-bucket/model9/group-SYSPLEX/imports/

A directory structure for mapping objects may look as follows:

model9-bucket/agents/group-SYSPLEX/resources/mappings, and a directory structure for chunk objects may look as follows:

model9-bucket/agents/group-SYSPLEX/resources/chunks/x/y/z.

On step 144, the data set may be closed without the LEAVE parameter, to disable further reading.

Listing 5 below shows exemplary assembly code for closing the data set. The code closes the data set using the LEAVE parameter, thus avoiding to need to unmount the tape and remount it for further imports.

Listing 5

```
*----------------------------------------------------------------
* CLOSE INPUT DD
*----------------------------------------------------------------
  CLOSE DS 0H
* Close leave only upon successful completion, otherwise close would produce error
      MVC  _W31.W31_CLOSE_LF,MCLOSE
      ASM_IF
  (CLI,_COMM.SEQR_STATE_FLAG_XL1,EQ,#SEQR_STATE_ERR) THEN
      ZM9CWTO LEVEL=DEBUG,'ZM9T000D CLOSING W/O LEAVE'
      CLOSE (_W24.W24_DCB),                +
          MODE=31,                         +
          MF=(E,_W31.W31_CLOSE_LF)
      ASM_ELSEIF (CLI,_COMM.SEQR_ABORT_SIGNAL_XL1,EQ, +
          #SEQR_ABORT_SIGNAL_Y) THEN
      ZM9CWTO LEVEL=DEBUG,'ZM9T000D CLOSING W/O LEAVE'
      CLOSE (_W24.W24_DCB),                +
          MODE=31,                         +
          MF=(E,_W31.W31_CLOSE_LF)
      ASM_ELSE,
      ZM9CWTO LEVEL=DEBUG,'ZM9T000D CLOSING W/ LEAVE'
      CLOSE (_W24.W24_DCB,LEAVE),          +
          MODE=31,                         +
          MF=(E,_W31.W31_CLOSE_LF)
      ASM_ENDIF ,
      LTR R15,R15
      JZ EXEC_ENDED
```

As for writing back data from an object storage, there are a number of cases. In a first case, the data is to be written back to a tape, in a second case the data is to be written back to a virtual tape, in a third case the data needs to be written to a disk, and in a fourth case the data is to be written to a disk in a tape format. The fourth case may occur when it is required to export back one or more files to a tape when the block size is larger than 32K, but no such tape is available, therefore the files may be exported to a disk in tape format, thereby avoiding the disk maximum block size limitation Referring now to FIG. 2, showing a flowchart of steps in a method associated with the first, second and third cases, for writing the data to a tape, a virtual tape, or a disk.

On step 200, a request may be received to write a data set corresponding to a file from object storage connected to a mainframe over TCP/IP, to a tape, a virtual tape or a disk mounted on a mainframe computer tape drive, virtual tape drive, or disk drive, respectively. The request may be received from a user by a user interface, from another computer program, or the like. The request may be received by a high level language program, or a corresponding high level language program may be started in response to such request.

On step 204, a mapping object corresponding to the file to be written may be located within the object storage.

On step 208, the VOL1 pointed at by the mapping object may be read, by THE high level language code.

On step 212, a tape or virtual tape or disk data set, according to the request received on step 200, may be allocated in the original data set record format, based on the parameters read from the VOL1.

On step 216, the file contents may be retrieved from the object storage to the data set, block by block. Retrieval may include prefetching the blocks.

On step 220, the contents may be provided block by block to be written on the tape, virtual tape or disk. Writing the blocks may comprise using the BSAM writer ASM program to perform the opposite of the BSAM reader described above. However, during writing it is not required to update the JFCB. Similarly to the reading, during writing the ASM program waits for the high level language program to provide a block, the ASM writes it, notifies the high level language program that it is ready for another block, and waits for the next block.

On step 224, the data set may be closed.

If it is required to write additional files, the process may be repeated as needed for writing additional files to the tape, virtual tape, or disk.

If the data set needs to be dispersed over multiple tapes, the EOV1 and EOV 2 will be written automatically to the tapes by the ZOS, and need not be handled by the high-level code.

Referring now to FIG. 3, showing a flowchart of steps in a method associated with the fourth cases, for writing the data to a disk in a tape format.

On step 300, a request may be received to write a data set corresponding to a file from object storage connected to a mainframe over TCP/IP, to a disk mounted on a mainframe computer disk drive, in tape format. The request may be received from a user by a user interface, from another computer program, or the like. The request may be received by a high level language program, or a corresponding high level language program may be started in response to such request.

On step 304, a mapping object corresponding to the file to be written may be located within the object storage.

On step 312, a disk data set may be allocated in AWSTAPE format.

On step 316, the file contents, as well as the VOL1, HDR1, HDR2, EOF1 and EOF 2 may be retrieved from the object storage to the data set, block by block. Retrieval may include prefetching the blocks.

On step 320, the VOL1, HDR1, HDR2, the contents of the file, EOF1 and EOF 2 may be provided block by block to be written on the disk.

On step 324, the data set may be closed.

If it is required to write additional files, the process may be repeated as needed for writing additional files to the disk.

Listing 6 below shows exemplary Java code for writing the file contents to a disk in tape format:

Listing 6

```
DataInputStream dataInputStream = new DataInputStream(inputStream);
if (exportType == ExportType.AWSTAPE) {
    if (storedMappingObjectDescriptor.
        getStoredBinaryFileDescriptor(TapeDataSetImporter.
        TAPE_TRAILER_FILE_NAME) == null
        || storedMappingObjectDescriptor
    .getStoredBinaryFileDescriptor(TapeDataSetImporter.TAPE_HEADER_FILE_
NAME) == null) {
        throw new BsamWriteUserException("Beta version import data set not
supported for AWSTAPE export");
        }
    logger.fine( )) -> "Getting input stream for header and trailer components");
    try (final InputStream headerInputStream =
    dataChunkReadaheadManager.createFromMappingDescriptor(
        bucket Wrapper,
        MissionType.DATASET_EXPORT,
        storedMappingObjectDescriptor,
        TapeDataSetImporter.TAPE_HEADER_FILE_NAME);
    final InputStream trailerInputStream =
    dataChunkReadaheadManager.createFromMappingDescriptor(
        bucketWrapper,
        MissionType.DATASET_EXPORT,
        storedMappingObjectDescriptor,
        TapeDataSetImporter.TAPE_TRAILER_FILE_NAME)) {
    DataInputStream headerDataInputStream = new
    DataInputStream(headerInputStream);
    DataInputStream trailerDataInputStream = new
    DataInputStream(trailerInputStream);
    loggerfine(( ) -> "Writing header component");
    writeDataFile(headerDataInputStream, tapeDataSetBlockSize, tapeDataSetLrecl,
        allocated Writer, blockCounter, currentBlockBytes);
    logger.fine(( ) -> "Writing data component");
    writeDataFile(dataInputStream, tapeDataSetBlockSize, tapeDataSetLrecl,
        allocatedWriter, blockCounter, currentBlockBytes);
    logger.fine(( ) -> "Writing trailer component");
    writeDataFile(trailerDataInputStream, tapeDataSetBlockSize, tapeDataSetLrecl,
        allocated Writer, blockCounter, currentBlockBytes);
        }
    } else {
        logger.fine(( ) -> "Writing data component");
        writeDatafile(dataInputStream, tapeDataSetBlockSize, tapeDataSetLrecl,
            allocatedWriter, blockCounter, currentBlockBytes);
        }
```

If it is required to write large blocks to the tape, the ASM writer may be written with Large Block Interface (LBI) support, and the corresponding control blocks may be updated accordingly. If it is required to export LBI to a disk, the data may be exported to a sequential data set with RECFM=FB and LRECL=80, thereby writing to the disk in tape format. The last record might contain spaces after the tape ended, and the tape may have a special mark.

Referring now to FIG. 4, showing a generalized block diagram of a mainframe computer configured to import data from a tape to an object storage and export data from an object storage to a tape, a virtual tape or a disk in tape format, in accordance with some embodiments of the disclosure.

A mainframe computer is a computer used primarily by large organizations for critical applications, bulk data processing, industry and consumer statistics, enterprise resource planning, transaction processing, or other tasks.

Mainframe 400 may comprise a processor 404. Processor 404 may be a Central Processing Unit (CPU), a microprocessor, an electronic circuit, an Integrated Circuit (IC), a Central Processor (CP), a System Z Information Integration Processor 25 (zIIP), a System Z Application Assist Processor (zAAP), or the like. Processor 404 may be utilized to perform computations required by the apparatus or any of its subcomponents.

In some exemplary embodiments of the disclosed subject matter, mainframe 400 may comprise an Input/Output (I/O) device 408 such as a display, a terminal, a printer, a network communications device, or the like. I/O device 408 may be utilized to provide output to and receive input from a user.

In some exemplary embodiments of the disclosed subject matter, mainframe 400 may comprise or be operatively connected to one or more storage devices 412. Storage device 412 may be a hard disk drive, a Flash disk, a Random Access Memory (RAM), a memory chip, real storage, main storage or the like. In some exemplary embodiments, storage device 412 may retain program code operative to cause processor 404 to perform acts associated with any of the programs executed by mainframe 400, such as the methods shown in FIGS. 1-3 above. The components detailed below may be implemented as one or more sets of interrelated computer instructions, executed for example by processor 404 or by another processor. The components may be arranged as one or more executable files, dynamic libraries, static libraries, methods, functions, services, or the like, programmed in any programming language and under any computing environment.

Storage device 412 may store assembly code 416 adapted to read and write data to and from tape storage 424.

Storage device 412 may store code in a high level language code, such as Java code 420 adapted to read and write data to and from object storage 428.

Object storage 428 can be implemented as any storage system employing the object storage architecture, and may or may not be distributed, and may or may not employ cloud storage, wherein the cloud may or may not be on-premise, and may be private or public.

Therefore, in order to access tape storage from high level code 420, high level code 420 may communicate with assembly code 416, which can then access tape storage 424.

It will be appreciated that additional components may be used, such as storage management software data facility data set services (DFDSS) and a corresponding wrapper, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
from high level language code, receiving a request for reading a data set from a tape mounted on a MAINFRAME computer tape drive or virtual tape drive, wherein the request for reading the data set is a request to copy the data set onto an object storage connected over TCP/IP;
from the high level language code running on the Mainframe operating system, allocating a data set on a tape comprising information to be imported, the allocation being in a format of the data set record as stored on the tape, and the allocation being associated with a Job File Control Block (JFCB), wherein the tape is mounted in Standard Label (SL) mode;
updating the JFCB in the data structure to Bypass Label Processing (BLP) mode instead of the SL mode;
reading VOL1 data from the tape;
for each file of a plurality of files stored on the tape initiating by the high level language code:
reading HDR1 of the file from the tape;
reading HDR2 of the file from the tape;
reading content of the file block-by-block;
reading EOF1 of the file from the tape; and
reading EOF2 of the file from the tape; and
organizing the VOL1, HDR1, HDR2, content, EOF1 and EOF2 in the object storage; and
closing the tape for further reading,
wherein said reading is performed without setting a job class environment of the mainframe Job Entry Subsystem to BLP mode, and
wherein said reading is performed without unmounting the tape after reading each file of the plurality of files.

2. The method of claim 1, wherein said allocating is in share disposition mode.

3. The method of claim 1, wherein the high level language code is Java code.

4. The method of claim 1, wherein said organizing comprises storing the HDR1, HDR2, content, EOF1 and EOF2 in a plurality of chunk objects, wherein a mapping object maps the chunks and a link object points at the mapping object.

5. The method of claim 1, wherein the VOL1, the HDR1 and HDR2 are stored in a header file comprised of a single first chunk, the EOF1 and EOF2 are stored in a trailer file comprised of a single second chunk, and the content is stored in an unnamed file comprised of one or more chunks, and wherein the mapping object points at the header file, at the unnamed file and the trailer file chunks.

6. The method of claim 1, wherein reading the content of the file into the data set allocated in record format is performed block by block regardless of records.

7. The method of claim 1, wherein the object storage is a cloud storage.

8. A computer program product comprising a computer readable storage medium retaining program instructions, which program instructions when read by a processor, cause the processor to perform a method comprising:
from high level language code, receiving a request for reading a data set from a tape mounted on a MAINFRAME computer tape drive or virtual tape drive, wherein the request for reading the data set is a request to copy the data set onto an object storage connected over TCP/IP;
from the high level language code running on the Mainframe operating system, allocating a data set on a tape comprising information to be imported, the allocation being in a format of the data set record as stored on the tape, and the allocation being associated with a Job File Control Block (JFCB), wherein the tape is mounted in Standard Label (SL) mode;
updating the JFCB in the data structure to Bypass Label Processing (BLP) mode instead of the SL mode;
reading VOL1 data from the tape;
for each file of a plurality of files stored on the tape initiating by the high level language code:
reading HDR1 of the file from the tape;
reading HDR2 of the file from the tape;
reading content of the file block-by-block;
reading EOF1 of the file from the tape; and
reading EOF2 of the file from the tape; and
organizing the VOL1, HDR1, HDR2, content, EOF1 and EOF2 in the object storage; and
closing the tape for further reading,
wherein said reading is performed without setting a job class environment of the mainframe Job Entry Subsystem (JES) to BLP mode, and
wherein said reading is performed without unmounting the tape after reading each file of the plurality of files.

* * * * *